Jan. 12, 1926.
C. V. ZOUL
1,569,695
APPARATUS FOR DE-EMULSIFICATION OF OILS, ETC
Filed Jan. 30, 1923
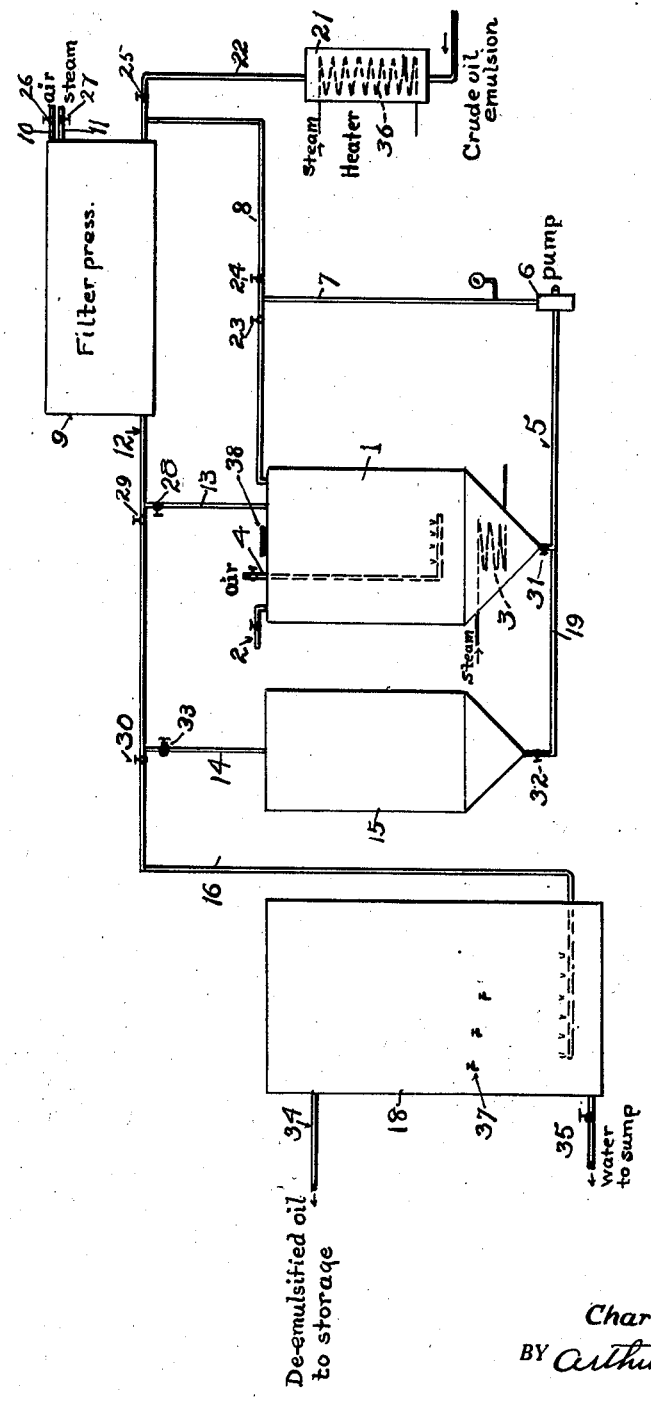
INVENTOR.
Charles V. Zoul
BY Arthur P. Knight
ATTORNEY.

Patented Jan. 12, 1926.

1,569,695

UNITED STATES PATENT OFFICE.

CHARLES V. ZOUL, OF SANTA MONICA, CALIFORNIA, ASSIGNOR, BY MESNE ASSIGNMENTS, TO THE CELITE COMPANY, A CORPORATION OF DELAWARE.

APPARATUS FOR DEEMULSIFICATION OF OILS, ETC.

Application filed January 30, 1923. Serial No. 615,781.

*To all whom it may concern:*

Be it known that I, CHARLES V. ZOUL, a citizen of the United States, residing at Santa Monica, in the county of Los Angeles and State of California, have invented a new and useful Apparatus for Deemulsification of Oils, Etc.

This invention relates to the de-emulsification of liquids and particularly to the de-emulsification of petroleum emulsions, such as are produced from various oil wells in California and elsewhere. The invention, however, is applicable to the de-emulsification of other oils, for example; vegetable and animal oils and fats.

The main object of the present invention is to provide for a rapid economical and uniform de-emulsification of petroleum emulsions or other emulsions.

The accompanying drawing is a flow sheet illustrating a suitable apparatus for carrying out the invention.

Referring to said drawing I have indicated at 1 a drying tank or receptacle which is provided with means 2 for supplying thereto a body of suitable oil with means such as a steam coil 3 for heating such body of oil and means indicated at 4 for blowing air through the body of oil in said receptacle. An outlet pipe 5 leads from tank 1 to a pump 6 for forcing the oil through pipes 7 and 8 to a filter-press indicated at 9 and said filter press may be of any usual or suitable type, for example a plate and frame press, or it may be a filter press of the rotary type adapted to maintain a definite thickness of filter-aid on the filtering medium. The filter press may be provided with means indicated at 10 for supplying air and also means indicated at 11 for supplying steam thereto, so as to provide for either blowing air or steam or both through the filter press for cleaning or for drying and warming.

The outlet pipe 12 leads from the filter press and has a branch connection 13 leading to the tank 1, and branch connection 14 leading to a storage tank 15 for dry oil and a branch connection 16 leading to a settling tank indicated at 18. An outlet pipe 19 leads from the storage tank 15 to the inlet in the line for pump 6.

Crude oil emulsion or other emulsion received from any suitable source is passed through a heater 21 (which may be provided with a steam heating coil 36) and pipe 22 to the inlet of the filter press 9. Suitable valves as indicated at 23, 24, 25, 26, 27, 28, 29, 30, 31, 32, and 33 are preferably provided for controlling various pipe lines.

A settling tank 18 is shown as provided with an overflow pipe 34 for the de-emulsified oil and a drain pipe 35 for water and with means such as pet cocks 37 for indicating the level of the water in the tank.

My process may be carried out in the above described apparatus in the following manner, assuming that the process is to be applied to the de-emulsification of crude oil emulsion:

A suitable quantity of pretreating liquid, consisting of oil, preferably similar to the oil constituent of said emulsion, is introduced into the tank 1, and such oil is heated by operation of means 3 to a temperature sufficient to expel water from the oil. A current of air is blown into the body of oil through the means 4 if necessary, to expedite the drying of the oil and in this operation the oil may be circulated by operation of pump 6 which draws the oil from the bottom of the tank 1 and returns it to the top of said tank. When the oil has been sufficiently dried in this manner and has been raised to the proper temperature, say, 120 to 160° F., communication is opened from the pump 6 to the filter press 9 and the hot dried oil is forced through the filter press for a sufficient length of time to raise the parts of the filter press to the required temperature, say 120 to 160° F., and to thoroughly dry all the parts of the filter press with which the emulsion is to come in contact, the oil being returned from the filter press to the tank 1 through pipes 12 and 13 so that it is redried in tank 1 and there is thus a continual circulation of dried heated oil through the filter press until the latter has been thoroughly dried and has been warmed to the desired temperature. A suitable quantity of finely divided (powdered) diatomaceous earth is then introduced into the tank 1, for example through inlet means 38, and mixed with the oil therein, said diatomaceous earth being either pre-dried or being dried after introduction into the tank by further operation of the drying means thereof. The mixture of dried oil and diatomaceous earth is then forced by pump 6 through the pipes 7 and 8 into the filter press with the result that the diatomaceous earth is deposited on the cloths or filtering media of the filter press, forming a precoat of suitable thickness on such media, for example from one-sixteenth to one-quarter inch thickness. During this operation the oil is preferably maintained at the temperature above specified and the operation is so carried on that during the formation of the pre-coat there is circulation from the heating tank to the filter press and back to the heating tank and the diatomaceous earth or de-emulsifying agent is preferably added in such proportion to tank 1 that it builds up or accumulates on the filtering media of the filter press by a series of operations, a further quantity being added at each circulation. By this means a uniform and effective pre-coat is assured.

The filter press, having thus been provided with a precoat and being thoroughly dried and heated to the required temperature, the pretreating and precoating oil may be withdrawn through pipes 12 and 14 to the tank 15 wherein it is reserved for the next preheating and precoating operation. The pump 6 and tanks 1 and 15 are then shut off from the filter press and connection is opened to the main pipe line 22 for supplying to the filter press the crude oil emulsion which is to be treated, said emulsion being heated, for example to a temperature of 120 to 160° F. in the heater 21, and being pumped into the filter press under suitable pressure. In passing through the precoating of diatomaceous earth or de-emulsifying agent in the filter press, the emulsion loses the emulsifying property by adsorption of the emulsifying agent or by other action of the de-emulsifying agent so that the liquid which passes from the filter press from the pipe line 12 to the settling tank 18 readily separates by a settling action into separate bodies of oil and water, the oil flowing out through the over-flow 34 and the water being drawn off through the pipe 35.

By the above described means, it is possible to so treat a crude oil emulsion, containing so much water as to be commercially valueless, in such manner that a petroleum product is obtained containing less than the maximum amount of water permitted for commercial purposes. For example, the water content of the petroleum may be reduced to less than one per cent.

It will be understood that the petroleum emulsion may, if desirable, be subjected to a preliminary heating and settling operation to permit some of the water therein to settle out, it being generally impossible, however, to remove enough of the water in this manner to produce a commercially valuable petroleum. The petroleum emulsion from which a portion of the water has been removed by settling is then subjected to the de-emulsifying operation above described, followed by the settling operation in tank 18 to produce a substantially de-hydrated petroleum.

A limited quantity of diatomaceous earth can be used in this manner to de-emulsify an extremely large quantity of petroleum emulsion. Eventually, however, it is desirable to clean the filter press, for example, by operation of means 10 and 11 and to renew a pre-coat by repeating the operation above described.

The de-emulsifying agent used in this process is preferably diatomaceous earth in pulverized or suitably divided condition, but may also consist of or comprise any one of the following named materials or mixtures of such materials with one another or with diatomaceous earth, namely: Wood pulp, sawdust; various vegetable or animal fibers such as cotton waste, wool waste, felt; or mineral fibers such as glass wool or asbestos; clay, alumina, charcoal or a bone black. It is to be understood, however, that in any case the material must be capable of forming a pre-coat of such porous nature as to permit passage of the emulsion therethrough and to act as a de-emulsifying agent, without undue retardation of the rate of flow of the emulsion through the coating of de-emulsifying agent.

In applying the invention to other emulsions, for example emulsions of fats and water requiring a higher temperature for rendering them sufficiently fluid to pass through the filter press, the heating means will be so operated as to maintain the required temperature in the filter press and to pre-heat the emulsion to the required temperature. On the other hand, in treating certain emulsions, for example; the emulsions produced by extraction of organic substances with solvents such as benzine, gasoline, etc., the use of heat may not be necessary. In any case, where the emulsion being treated, contains constituents which are volatile at the temperature of the operation, the process is preferably carried out wholly in enclosed apparatus, thus, the filter press and the supply and outlet connections for the crude emulsion and the de-emulsifying liquid and the settling tank for receiving such liquid, are all preferably enclosed so as to prevent loss by evaporation of any gasoline or other volatile constituent.

What I claim is:

1. An apparatus for de-emulsifying liquids comprising a filter, precoating means for mixing finely divided material with a precoating liquid and for passing such liquid through the filter to precoat the same, supply means for supplying emulsion to be treated to such precoated filter under pressure, means for heating said emulsion prior to passage through the filter, discharge means adapted to conduct from the filter, the filtrate resulting from the passage of emulsion therethrough, and means for receiving said filtrate and permitting separation of the constituents thereof, said heating means, filter, discharge means, and receiving means, together with the connections therefor being enclosed so as to prevent loss of volatile constituents from the heated emulsion and from the resulting filtrate.

2. An apparatus comprising a filtering apparatus a receptacle adapted to contain precoating liquid and a supply of precoating de-emulsifying agent; means for warming and drying the contents of said receptacle; means for supplying air to said receptacle, means for forcing precoating liquid from said receptacle to the filtering apparatus to warm and dry the same and produce a precoat on the filtering media thereof; an additional receptacle for pre-dried liquid; means for conducting the liquid from the filtering apparatus to said last named receptacle; and means for returning liquid from the filtering apparatus to the warming and drying receptacle.

3. An apparatus comprising a receptacle adapted to contain precoating liquid and a supply of precoating de-emulsifying agent; means for warming and drying the contents of said receptacle; a filter press; means for forcing precoating liquid from said receptacle to the filter press to warm and dry the filter press and produce a precoat on the filtering media thereof, means for returning liquid from the filter press to the warming and drying receptacle; a second receptacle for pre-dried liquid and means for conducting the liquid from the filter press to said last named receptacle.

4. An apparatus for de-emulsifying liquids comprising a filtering apparatus, a receptacle adapted to contain a precoating liquid, means for supplying de-emulsifying agent to said receptacle, means for heating the contents of said receptacle, means for forcing the precoating liquid from said receptacle to said filtering apparatus, means for returning the liquid from the filtering apparatus to said receptacle, supply means for supplying emulsion to be treated to the filtering apparatus, a second receptacle adapted to receive liquid, and separate means for conducting the filtrate to said second receptacle so as to permit a gravitational separation of the constituents thereof.

In testimony whereof I have hereunto subscribed my name this 25th day of January 1923.

CHARLES V. ZOUL.